United States Patent
Renders

(10) Patent No.: US 6,263,695 B1
(45) Date of Patent: Jul. 24, 2001

(54) DEVICE FOR RECOVERING AND SEPARATING IMPURITIES FROM THE COOLING FLUID OF A CONDITIONING SYSTEM

(75) Inventor: Marie Joseph Renders, Becrsel (BE)

(73) Assignee: North European and Investments H.S.A., Luxembourg ( * ) Notice: Subject to any disclaimer, the term of this patent is extended or adjusted under 35 U.S.C. 154(b) by 0 days.

(21) Appl. No.: 09/380,193

(22) PCT Filed: Mar. 2, 1998

(86) PCT No.: PCT/EP98/01148

§ 371 Date: Aug. 26, 1999

§ 102(e) Date: Aug. 26, 1999

(87) PCT Pub. No.: WO98/37936

PCT Pub. Date: Sep. 3, 1998

(30) Foreign Application Priority Data

Feb. 28, 1997 (IT) ................................. FI97AO035

(51) Int. Cl.$^7$ ................................... F25B 43/04
(52) U.S. Cl. ................................ 62/475; 62/292
(58) Field of Search .................... 62/475, 474, 292, 62/503, 509, 85

(56) References Cited

U.S. PATENT DOCUMENTS

| 2,762,429 | 9/1956 | Petersen . | |
|---|---|---|---|
| 2,834,409 | 5/1958 | Petersrn . | |
| 4,217,765 | * 8/1980 | Ecker | 62/503 |
| 5,167,126 | * 12/1992 | Cartwright | 62/292 X |
| 5,263,331 | * 11/1993 | Sergius | 62/475 X |
| 5,377,501 | * 1/1995 | Muston | 62/292 |
| 5,605,054 | * 2/1997 | Chen | 62/475 X |

FOREIGN PATENT DOCUMENTS

| 588213C | 11/1925 | (DE) . |
| 3617314A | 11/1987 | (DE) . |

* cited by examiner

*Primary Examiner*—Michael Powell Buiz
*Assistant Examiner*—Chen-Wen Jiang
(74) *Attorney, Agent, or Firm*—Welsh & Katz, Ltd.

(57) ABSTRACT

A device for recovering and separating impurities from the cooling fluid of a conditioning system comprises: a cylindrical container provided at its top with an inlet for the fluid/impurities mixture and with an outlet for the fluid and at its bottom with an outlet for the impurities, with a coil positioned inside the container and provided with an inlet and with an outlet to/from the container, a metal cylinder secured within the container and provided with an inlet and with an outlet, a first duct comprising a compressor for the connection of the upper outlet of the container with the inlet of the inner cylinder, a second duct comprising a condenser for the connection of the outlet of the coil with an external collection tank, a third duct for the connection of the outlet of the inner cylinder with the inlet of the coil.

7 Claims, 1 Drawing Sheet

DEVICE FOR RECOVERING AND SEPARATING IMPURITIES FROM THE COOLING FLUID OF A CONDITIONING SYSTEM

BACKGROUND OF THE INVENTION

The present invention relates to a device for recovering and separating from impurities the cooling fluid of a conditioning and/or climatisation system, especially but not exclusively for motor vehicles.

DESCRIPTION OF RELATED ART

It is well known that the maintenance of conditioning and/or climatisation systems provides for periodically emptying the system with the recovery of the cooling fluid, which needs to be freed of impurities, especially oil and water vapor, which accumulate during its operation. In the prior art, devices are also known for the recovery of the cooling fluid and its separation from impurities, which comprise:

a container, an inlet for the fluid/impurities mixture and an outlet for the fluid provided in the top part of said container, an outlet for impurities provided in the bottom part of said container, heating means provided within said container to vaporize the cooling fluid separating it from the solid impurities and form the liquid impurities having higher boiling point, a first duct comprising a compressor for drawing the fluid from said outlet and for feeding, at a higher temperature, said heating means, a second duct for transferring the fluid from said heating means to a collection tank external to said container.

Said heating means generally comprise a copper coil placed in contact, within the container, with the fluid/impurities mixture collected, mostly in liquid phase, by the conditioning system. By effect of the heating action effected by the coil, the cooling fluid evaporates separating itself from the impurities, which have higher evaporating temperature. The fluid exits the container and is conveyed, by means of the first duct provided with compressor, into the coil located within the container itself. The action of the compressor determines a rise in the temperature of the fluid, inside the coil, with the subsequent heating effect in the container.

With the progressive evaporation of the cooling fluid the liquid phase of the fluid/impurities mixture is enriched in oil and impurities and it is evident that, in order to obtain the total evaporation of the cooling fluid, it is necessary for the mixture top be in direct contact with the coil and in any case an adequate heat exchange surface area is required. Hence, the coil cannot suffice to cause the evaporation of the entire liquid phase of the fluid.

To overcome this drawback the proposal has been advanced, among others, of structuring the heating means in the form of two coils arranged in series, coaxial and positioned one outside the other. However, this solution is not fully satisfactory because, when the level of liquid mixture in the container is very low, the exchange surface is not sufficient to determine a complete and rapid evaporation of the cooling fluid. This entails, in practical use, an undesired permanence of a certain quantity of cooling fluid, highly polluting, amongst the impurities which are expelled at the end of the process.

BRIEF SUMMARY OF THE INVENTION

The main object of the present invention therefore is to provide a device by means of which the recovery and separation form impurities of the cooling fluid occur completely and very rapidly.

Said object is attained by means of a device, of the type described above, wherein a portion of the container, adjacent to the base thereof, is enclosed by walls made4 of heat conducting material and is part of the heating means.

In particular said portion of volume is advantageously enclosed in at least one hollow body—preferably of cylindrical shape—placed in communication with at least one coil and fitted with an inlet for the entrance from the first duct of the compressed fluid.

A device in accordance with the invention yields multiple advantages. In the first place the presence of the portion of heating volume adjacent to the base, an in particular of the cylindrical hollow body, causes the liquid at all times to be in contact wit a sufficiently ample exchange surface. Moreover, this surface being on the bottom of the container, even the late thin layer of liquid is in contact with the heat source, so that all of the liquid can evaporate. Secondly the times required for complete evaporation are considerably reduced since, other parameters being equal, during the final phase the global exchange coefficient changes little, since the liquid always remains in contact with the cylindrical body and therefore the flow rate of processed fluid varies only slightly. In the third place all the cooling fluid is made to evaporate, and therefore it is recovered, without releasing residues into the environment.

These and additional advantages and characteristics of the invention shall be made more evident in the detailed description that follows, made with reference to the accompanying drawing, which schematically shows an embodiment provided purely by way of non limiting example.

BRIEF DESCRIPTION OF THE DRAWINGS

The FIGURE comprises a schematic of one embodiment of the invention.

DETAILED DESCRIPTION OF THE INVENTION

Figure 1:
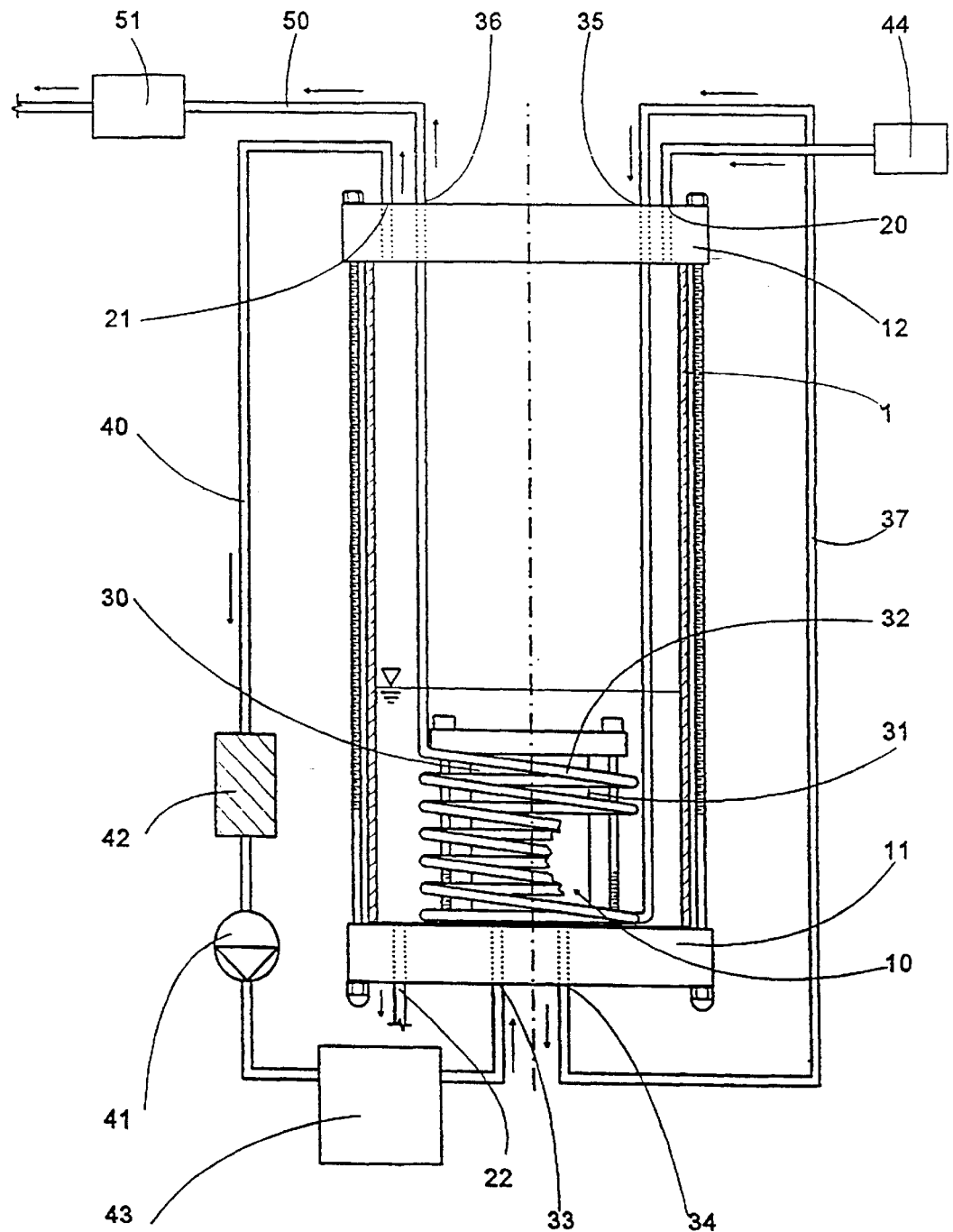

With reference to the enclosed FIGURE, a device according to the invention essentially comprises:

a container 1, preferable of cylindrical shape, provided, in the upper base 12 with an inlet 20 for the fluid/impurities mixture and with an outlet 21 for the fluid and, in the lower base 11, with an outlet 22 for impurities:

a coil 32, positioned inside the container 1 and provided with an inlet 35 and with an outlet 36, to /from the container, positioned in the upper base 12 thereof:

a metal cylinder 30, secured within the container 1 on the lower base 11 and closed at the top, which cylinder is fitted with an inlet 33 and with an outlet 34 positioned in the lower base 11;

a first duct 40, comprising a filter 42, a compressor 41, and an oil separator 43, which first duct connects the upper outlet 21 of the container with the inlet 33 of the inner cylinder 30;

a second duct 50-, comprising a condenser 51, which second duct connects the outlet 36 of the coil 32 with an external collection tank (not shown);

a third duct 37, which connects the outlet 34 of the inner cylinder 30 with an inlet 35 of the coil 32.

Advantageously the base diameter of the inner cylinder 30 is smaller than that of the cylindrical container 1 so that, between the side wall 31 of the cylinder and the side wall of the container, there is a free portion of volume. Moreover the inner cylinder 30 is coaxial to the coil 32, which develops around it, and both are coaxial to the container 1. Operation is as follows: from the conditioning system 44 the cooling fluid/impurities mixture is drawn and inserted, mostly in liquid phase, into the container 1 through the inlet 20. Inside the container 1 act as heating means—as shall be described better farther on—the coil 32 and the cylinder 30, which determine the evaporation of the cooling fluid and the subsequent separation from the solid impurities and from the liquid impurities having highest boiling point. Impurities are extracted from the container 1 through the lower outlet 22.

The cooling fluid, vaporized, is then conveyed, throughout the outlet 21, into the first duct 40 and subjected to the action of the compressor 41, which also causes it to overheat. Thorough the oil separator 43, the fluid, compressed and overheated, is reinserted into the container 1 and, more specifically, inside the metal cylinder 30 through the inlet 33. The fluid then exits the cylinder 30 and, through the third duct 37, is conveyed to the coil 32, through the inlet 35.

Having traveled through the coil 32, the fluid exists the container 1, through the outlet 36 and, through the second duct 50 provided with condenser 51, is sent to the collection tank. The portion of volume 10, enclosed by the metal walls 31 of the inner cylinder 30, and the coil 32, traveled by the compressed and overheated fluid, therefore serve as heating means, which determine the vaporization and separation of the fluid from the impurities.

With the present invention the liquid fluid/impurities mixture is at all times in contact with a heat exchange surface constituted by the wall 31 of the cylinder 32, even when the level of liquid is very low. This offers the advantage, with respect to prior art devices, of determining a complete and rapid evaporation of the cooling fluid, without any part thereof remaining among the extracted impurities, with the deriving hazard of release into the environment.

The invention thus conceived can be subject to numerous modifications and variations, without thereby departing from the scope of the inventive concept. Moreover, all components may be replaced by technically equivalent elements.

What is claimed is:

1. Device for recovering and separating from impurities the cooling fluid of a conditioning system, comprising:

a container, an inlet for the fluid/impurities mixture and an outlet for the fluid provided in the upper part of said container, an outlet for impurities provided in the lower part of said container, heating means provided inside said container to vaporize the cooling fluid separating it from the solid impurities and from the liquid impurities having a higher boiling point, a first duct comprising a compressor for drawing the fluid from said outlet for feeding, at a higher temperature, said heating means, a second duct for transferring the fluid from said heating means to a collection tank external to said container, wherein a portion of volume of said container, adjacent to the lower base, is enclosed by walls made of heat conducting material and it is part of said heating means, and said portion of volume is in communication with an inlet in communication with said first duct.

2. Device according to claim 1, wherein said hollow body is provided with an outlet placed in communication with said coil by means of a third duct.

3. Device according to claim 1, wherein said hollow body is of cylindrical shape.

4. Device according to claim 3, wherein said container is of cylindrical shape and the base diameter of said cylindrical hollow body is smaller than that of the cylindrical container, said cylindrical hollow body being coaxial to said coil, which develops around it, both being coaxial to said cylindrical container.

5. Device according to claim 1, wherein said first duct comprises a filter and an oil separator respectively upstream and downstream of said compressor and said second duct comprises a condenser of the fluid.

6. Device for recovering and separating from impurities the cooling fluid of a conditioning system, comprising:

a container, an inlet for the fluid/impurities mixture and an outlet for the fluid provided in the upper part of said container, an outlet for impurities provided in the lower part of said container, heating means provided inside said container to vaporize the cooling fluid separating it from the solid impurities and from the liquid impurities having a higher boiling point, a first duct comprising a compressor for drawing the fluid from said outlet for feeding, at a higher temperature, said heating means, said first duct comprises a filter and an oil separator respectively upstream and downstream of said compressor, a second duct for transferring the fluid from said heating means to a collection tank external to said container, wherein a portion of volume of said container, adjacent to the lower base, is enclosed by walls made of heat conducting material and is a part of said heating means.

7. The device of claim 6 wherein said second duct comprises a condenser of the fluid.

* * * * *